(12) United States Patent
Ando et al.

(10) Patent No.: US 6,587,123 B2
(45) Date of Patent: *Jul. 1, 2003

(54) VIDEO MATERIAL SELECTING APPARATUS AND METHOD FOR SELECTING VIDEO MATERIAL

(75) Inventors: Tomoe Ando, Kanagawa (JP); Shinichi Komori, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,801

(22) Filed: Mar. 23, 1999

(65) Prior Publication Data

US 2002/0167541 A1 Nov. 14, 2002

(30) Foreign Application Priority Data

Mar. 26, 1998 (JP) .............................. 10-079889

(51) Int. Cl.⁷ ................................................ G06F 3/00
(52) U.S. Cl. ........................ 345/723; 345/716; 345/719
(58) Field of Search ................... 345/326, 327, 345/328, 339, 340, 968, 348, 349, 302, 716, 719, 723, 764, 781; 707/3, 104; 386/52, 55

(56) References Cited

U.S. PATENT DOCUMENTS

| | | | | |
|---|---|---|---|---|
| 5,388,197 A | * | 2/1995 | Rayner ........................ | 345/723 |
| 5,459,830 A | | 10/1995 | Ohba et al. .................. | 345/473 |
| 5,521,841 A | * | 5/1996 | Arman et al. ................ | 345/723 |
| 5,801,685 A | * | 9/1998 | Miller et al. ................. | 345/302 |
| 5,861,880 A | * | 1/1999 | Shimizu et al. ........... | 707/500.1 |
| 5,963,204 A | * | 10/1999 | Ikeda et al. .................. | 345/328 |
| 5,966,122 A | * | 10/1999 | Itoh ............................ | 345/328 |
| 6,026,389 A | * | 2/2000 | Nakajima et al. .............. | 707/1 |
| 6,052,492 A | * | 4/2000 | Bruckhaus ................... | 382/284 |
| 6,182,069 B1 | * | 1/2001 | Niblack et al. ................ | 707/6 |
| 6,204,840 B1 | * | 3/2001 | Petelycky et al. ........ | 707/500.1 |

* cited by examiner

Primary Examiner—Raymond J. Bayerl
Assistant Examiner—Kieu D. Vu
(74) Attorney, Agent, or Firm—Frommer Lawrence & Haug LLP; William S. Frommer

(57) ABSTRACT

A video material selecting apparatus and a method for selecting a video material are proposed, which can remarkably improve the operating efficiency of the selecting operation for the video material. The video data and associated data of each video materials which satisfy requirements inputted through an inputting means, out of the plurality of video materials from a storing means, and the reference image and associated information of each video material are displayed on a screen based on the video data and the associated data.

10 Claims, 17 Drawing Sheets

VIDEO MATERIAL SELECTING APPARATUS AND METHOD FOR SELECTING VIDEO MATERIAL

BACKGROUND OF THE INVENTION

1. Field of the Invention

This invention relates to a video material selecting apparatus and a method for selecting a video material, and more particularly, is preferably applicable to an edit decision list creating device.

2. Description of the Related Art

In the edit decision list creating device, the video of a video and audio material designated out of video and audio materials previously stored in a video server can be displayed on a monitor and sound can be outputted from a speaker.

Consequently, in the edit decision list creating device, an operator can create an edit decision list (EDL) for specifying the contents of edit, such as in which order and how video and audio materials are connected together, based on these video and sound.

In such edit decision list creating device, a keyword or the like is inputted so that the text information of a video and audio material, such as a file name or a title, corresponding thereto can be displayed on a screen out of a plurality of video and audio materials stored in a video server, and an operator can select the video and audio materials to be employed for editing based on the text information displayed on the screen.

However, in such edit decision list creating device, since only the text information of the video and audio material corresponding to the keyword or the like inputted can be displayed on the screen as described above, the operator needs to select a desired video and audio material while reproducing the video and audio materials one by one and conforming the contents of them when a plurality of similar text information are present in a plurality of video and audio materials selected. Therefore, the edit decision list creating device has been disadvantageously low in its operating efficiency.

SUMMARY OF THE INVENTION

In view of the foregoing, an object of this invention is to provide a video material selecting apparatus and a method for selecting video material in which the operating efficiency of the selecting work for a video material can be remarkably improved.

The foregoing objects and other objects of the invention have been achieved by the provision of a video material selecting apparatus which reads the video data and associated data of video materials which satisfy the inputted requirements out of the plurality of video materials from storing means and displays the reference image and associated information of each video material on a screen based on the video data and the associated data.

As a result, in the video material selecting apparatus, the operator can grasp the contents of each relevant video material based on the reference image and associated information of each of video materials which satisfy the requirements and which are displayed on the screen, and select a desired video material with ease.

Further, the present invention provides a method of selecting a video material to select a desired video material out of a plurality of video materials. In this method, the reference image and associated information of each of the video materials which satisfy the prescribed requirements can be displayed on a screen out of the plurality of video materials.

Consequently, according to the method for selecting a video material, the operator can grasp the contents of each relevant video material based on the reference image and associated information of each of video materials which satisfy the requirements and which are displayed on the screen and easily select a desired video material.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
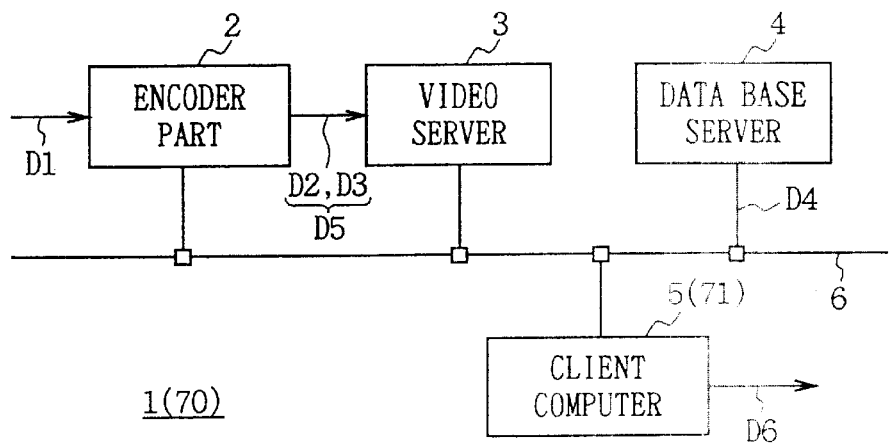
FIG. 1 is a block diagram showing the configuration of an edit decision list creating device to which the present invention is applied.

Preferred embodiments of this invention will be described with reference to the accompanying drawings:

(1) First Embodiment (1-1) Constitution of Edit Decision List Creating Device According to First Embodiment As shown in FIG. 1, reference numeral 1 generally designates an edit decision list creating device to which the present invention is applied and which comprises an encoder part 2, a video server 3, a data base server 4 and a client computer 5 which are connected together through a local network 6.

The encoder part 2 is composed of a personal computer on which an encode board is mounted, which sequentially fetches the data DI of each video and audio material which is transferred from a material collecting spot through a transmission line, such as a telephone line and a satellite communication line, or which is reproduced and supplied by a video tape recorder from a data collecting tape, compresses and encode the data based on the dynamic image experts group phase 2 (MPEG 2) standard, and transmits encode data D2 thus obtained to the video server 3.

Figure 2:
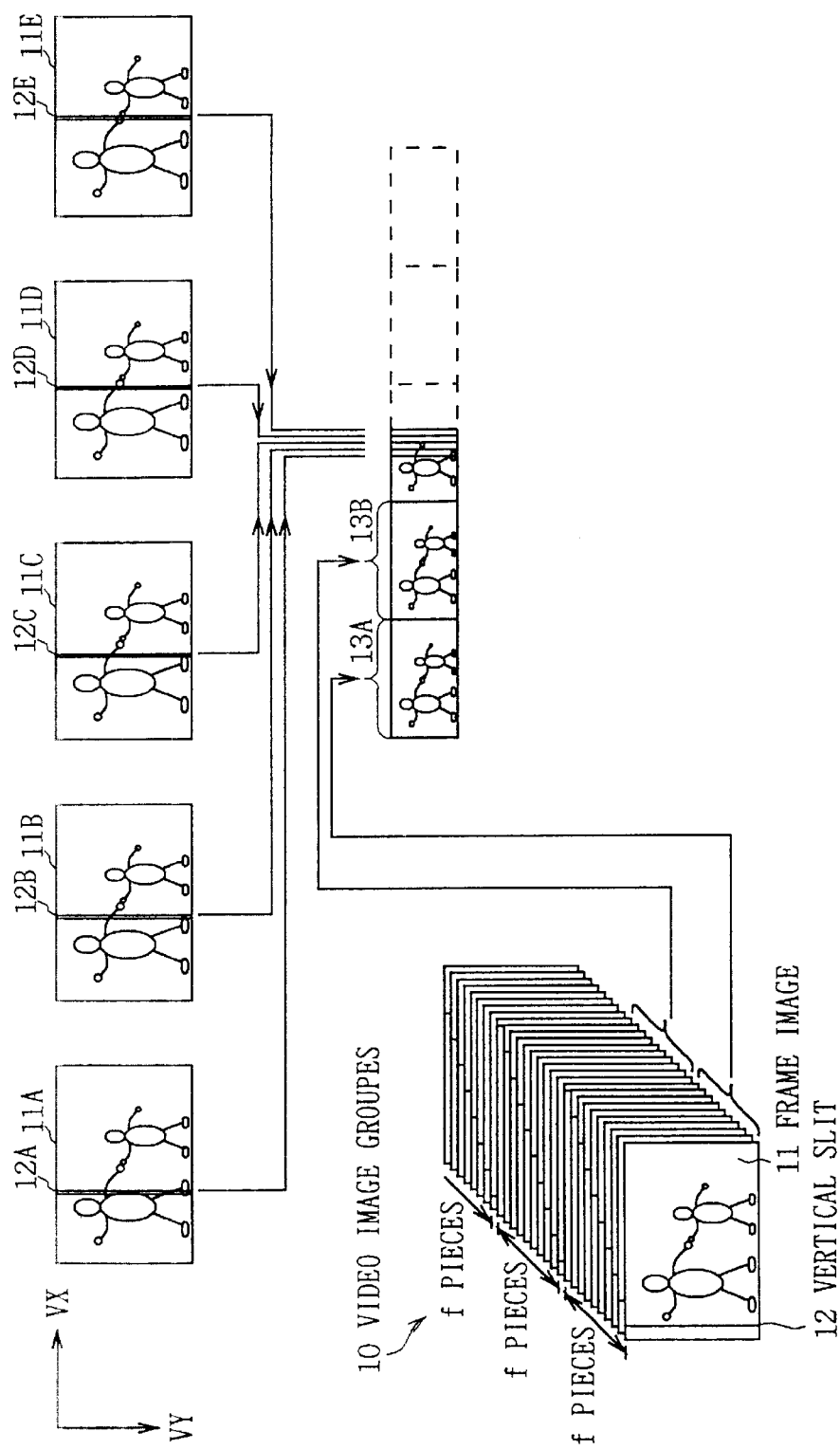
FIG. 2 is a diagrammatic view explaining a video browser.

Further, as illustrated in FIG. 2, the encoder part 2 extracts slit images 12 (12A, 12B, . . . ) in the vertical direction (shown in an arrow mark VY) while moving the slit images 12 sequentially toward one direction (a direction shown by an arrow mark VX) every n pieces of frame images 11 (11A, 11B, . . . ) of a series of successive frame image groups obtained based on the data D1 of the video and audio materials. Then, the encoder part 2 forms the image data of static images (called browser images, hereinafter) 13A, 13B . . . which are formed by sequentially arranging these slit images 12 thus extracted in the other direction (in the direction opposite to that shown by the arrow mark VX) and transmits the image data thus formed to the video server 3 as browser image data D3.

In this connection, in the browser images 13A, 13B, . . . , assuming that n=1, the horizontal direction of the frame images has x dots and the width of the slit images is $\Delta x$ dots, a browser image for one frame which having x dots in the horizontal direction is formed by using f pieces of frame images 11 (11A, 11B . . . ) which is obtained by the following equation (1).

$$f = \frac{x}{\Delta x} \quad (1)$$

Thus formed browser image 13A, 13B . . . for one frame can be recognized as the static image in which the contents of dynamic images based on the f pieces of frame images 11 (11A, 11B . . . ) are compressed.

On the other hand, the video server 3 is composed of an audio video (AV) server which has a recording and reproducing part with a disk array construction and which is capable of inputting and outputting data at high speed. The video server 3 sequentially fetches the encode data D2 and the browser image data D3 supplied from the encoder part 2, makes files from them and stores the files in the recording and reproducing part every video and audio material.

Further, at this time, the data (text data) D4 of text information, such as the file names or the titles, of each video and audio material inputted by an operator from a text data input part not shown is given to the data base server 4 through the local network 6. Thus, the data base server 4 forms and stores the data base of the text data D4 of each video and audio material.

Then, file data D5 composed of the encode data D2 and the browser image data D3 of each respective video and audio material, which is stored in the video server 3, and the corresponding text data D4, which is stored in the data base server 4, can be read by using the client computer 5.

In practice, when the operator inputs a keyword and the search instruction for the corresponding video and audio material at the time of a material selection mode, the client computer 5 controls to search the corresponding video and audio material based on the data base, which is stored in the data base server 4, and read the text data D4 of the video and audio material.

Further, the client computer 5 makes the video server 3 to read the file data D5 of the corresponding video and audio materials based on the search result. Then, based on the file data D5 and the text data D4 supplied from the data base server 4, the client computer 5 displays the dynamic images of the browser images of the corresponding respective video and audio materials (that is to say, the dynamic images obtained by sequentially displaying the browser images one frame by one frame with prescribed frame frequency, which are referred to as dynamic browser images, hereinafter) or the dynamic images of the video and audio materials, and the text information thereof on a display in a list form.

As a result, the operator can select a desired video and audio material based on the dynamic browser images or the dynamic images of the corresponding video and audio materials and the text information which are displayed on the display.

Furthermore, when one video and audio material is selected out of the video and audio materials selected in the above-mentioned manner and a reproducing instruction therefor is inputted at the time of an edit decision list creating mode, the client computer 5 makes the video server 3 read the file data D5 of the video and audio material and displays the dynamic image based on the file data D5 on the display.

Consequently, the operator can designate an in point and an out point and register the desired part of the video and audio material as a clip while visually recognizing the dynamic image being displayed on the display. Thus, the operator can register the desired parts of a plurality of video and audio materials as clips in the same manner.

Then, the operator can create an edit decision list in which the contents of editing as to how the clips registered in such a manner are connected together are specified, by employing the client computer 5. The data D6 of the edit decision list (this is called edit decision list data, hereinafter) created in the above-mentioned manner is supplied to an edit processing system from the client computer 5. In the edit processing system, an actual edit processing is carried out based on the edit decision list data D6.

(1-2) Constitution of Client Computer

Figure 3:
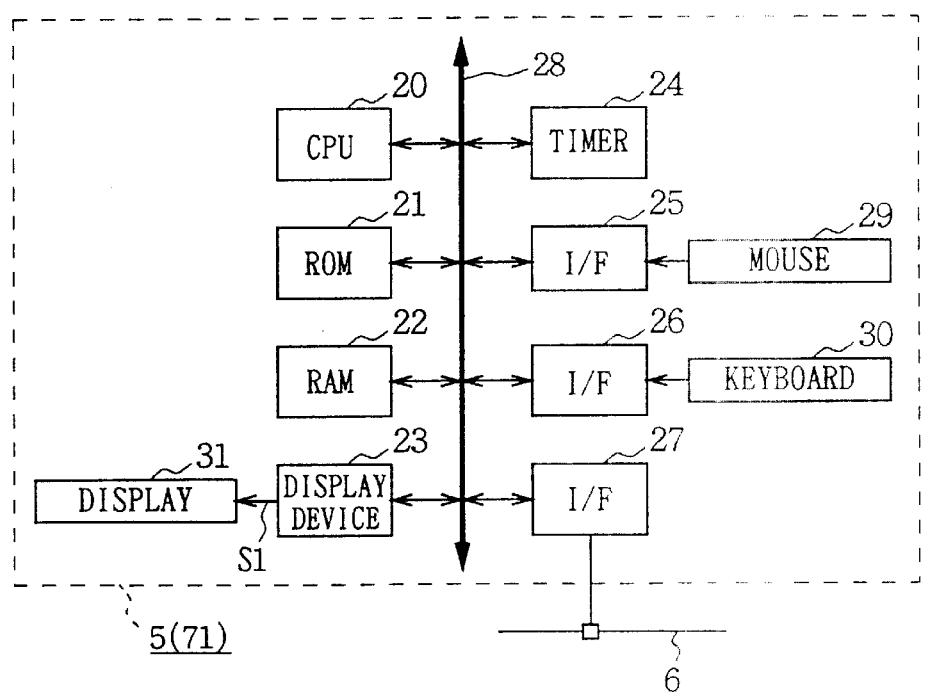
FIG. 3 is a block diagram showing the configuration of a client computer.

Here, the client computer 5 comprises, as illustrated in FIG. 3, a central processing unit (CPU) 20, a read only memory (ROM) 21, a random access memory (RAM) 22, a display processing part 23, a timer 24 and a plurality of interface circuits 25 to 27, which are connected together through a CPU bus 28. A mouse 29 and a keyboard 30 are connected thereto respectively through the first and second interface circuits 25 and 26 and a local network 6 is connected to the client computer 5 through the third interface circuit 27.

In this case, when an effective instruction for a prescribed processing is supplied through the first or second interface circuits 25 and 26 to the CPU 20 by operating the mouse 29 or the keyboard 30, the CPU 20 makes access to the video server 3 (see FIG. 1) and the data base server 4 (see FIG. 1) sequentially through the third interface circuit 27 and the local network 6 as desired based on a program stored in the ROM 21 and thereby, the file data D5 and its text data D4 of a required video and audio material can be read out.

Further, the CPU 20 reads out image data from the ROM 21 as required based on the program stored in the ROM 21 and supplies the read data to a display 31 through the display processing part 23 as a video signal S1. Thereby, an image is displayed on a graphical user interface (GUI) screen described below and moreover, numerical characters, characters and the like inputted with a cursor moving in the screen in response to the mouse or the keyboard 30 are displayed on a display 31.

Further, the CPU 20 supplies the file data D5 of each video and audio material fetched through the third interface circuit 27 to the display processing part 23. Then, the CPU 20 makes the display processing part 23 decode the file data D5 if necessary, and then supplies the video signal Si thus obtained to the display 31. Thereby, the dynamic browser images or the dynamic images of the corresponding video and audio materials is displayed on the corresponding positions of the GUI screen.

(1-3) GUI Screen in Client Computer

Figure 4:
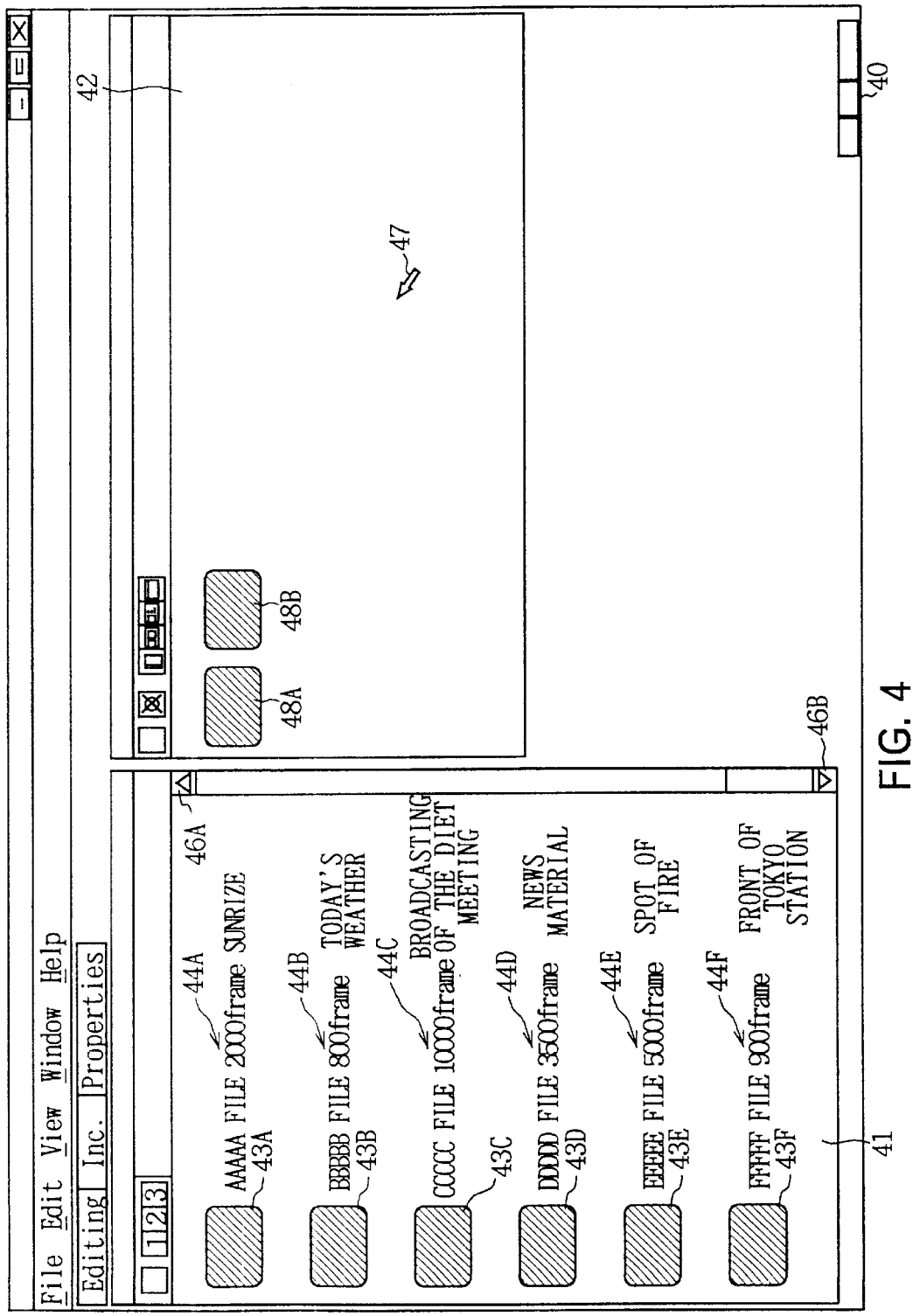
FIGS. 4 to 6 are diagrammatic views showing the configuration of a GUI screen according to a first embodiment.

In practice, the CPU 20 displays a GUI screen 40 as illustrated in FIG. 4 on the display 31, based on the file data D5 of the corresponding video and audio materials read from the video server 3 in response to a keyword inputted by the operator and the text data D4 of the corresponding video and audio materials read from the data base server 4 in a material selection mode.

As apparent from FIG. 4, the GUI screen 40 comprises a list display window 41 and a selected material display window 42. In the list display window 41, the dynamic browser images or the dynamic images (called them reference images 43A to 43F, hereinafter) of the corresponding video and audio materials and text information 44A to 44F, such as the names of files, the number of frames and the names of materials, are displayed in a list form.

Further, a scroll-up button 46A and a scroll-down button 46B are provided at the right end parts of the list display window 41. These scroll-up button 46A and scroll-down button 46B are pressed down so as to scroll the list displayed in the list display window 41.

Then, in the GUI screen 40, after the cursor is moved onto the reference image 43A to 43F of the desired video and audio material, the button of the mouse 29 is pressed down, the cursor 47 is moved to a desired position in the selected material display window 42 under this state, and then, the button of the mouse 29 is released (drag and drop), so that the video and audio material can be selected and the representative images 48A and 48B of the video and audio material selected at this time are displayed in positions dropped by the cursor in the selected material display window 42.

Figure 5:
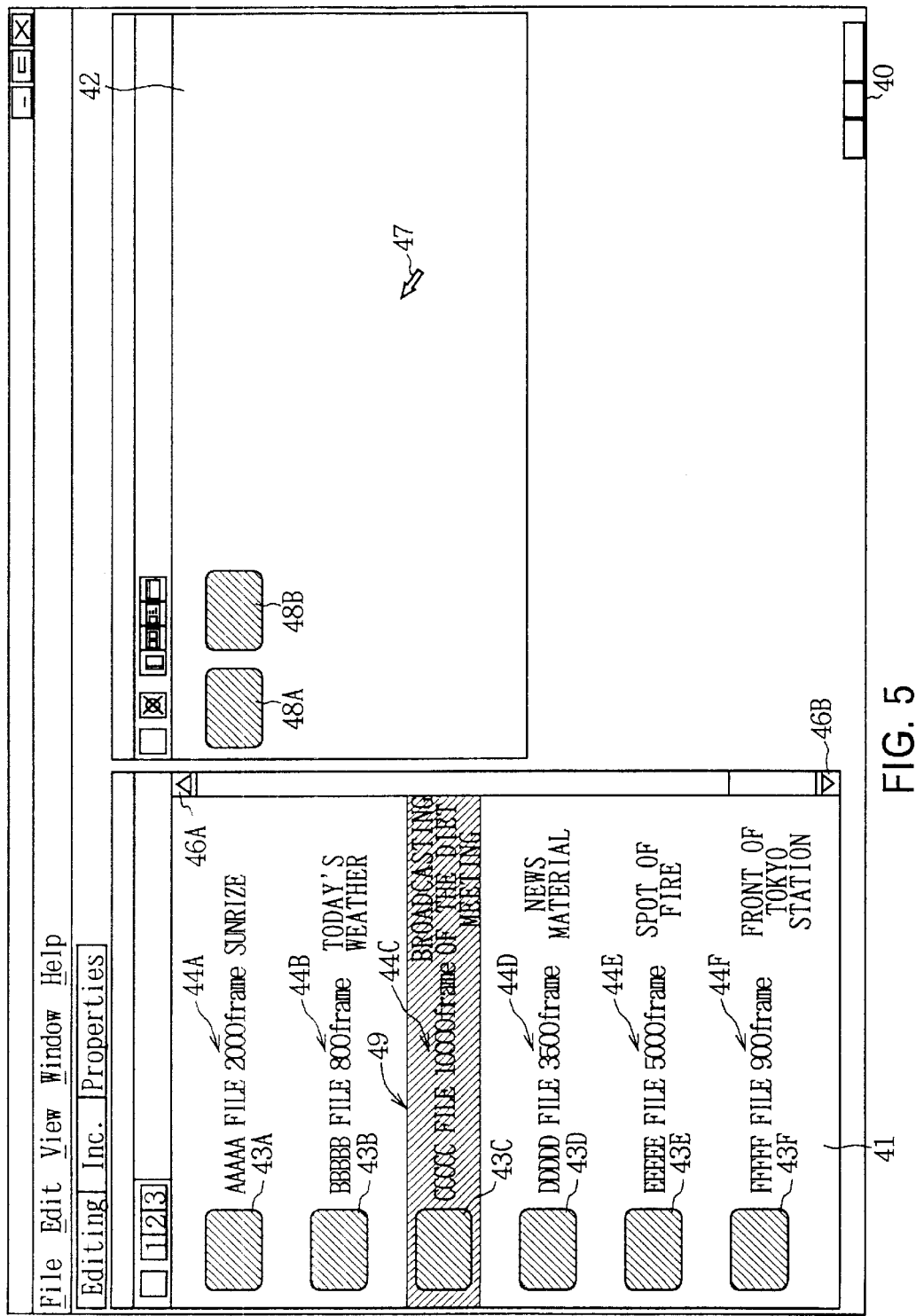

At this time, in the list display window 41, a frame 49 is displayed as shown in FIG. 5 so as to surround a line in which the reference image 43A to 43F of the selected video and audio material and the text information 44A to 44F thereof are displayed. And, the inside background color of the frame 49 is changed to a prescribed color and the text information 44A to 44F is represented in a prescribed intensified color in the frame 49.

In this connection, such video and audio materials can be also selected from the lists displayed in the list display window 41 by double-clicking the lines in which the reference images 43A to 43F of the desired video and audio material and the text information 44A to 44F thereof are displayed.

In addition, when the selection of the video and audio material is cancelled, a suitable line in the list displayed in the list display window 41 may be clicked. As a result, the frame 49 displayed so as to surround the line is erased from the screen and the background color is returned to an ordinary color and the text information is also represented in an ordinary color. Besides, the representative images 48A and 48B of the video and audio material displayed at that time in the selected material display window 42 are also erased from the screen.

Figure 6:
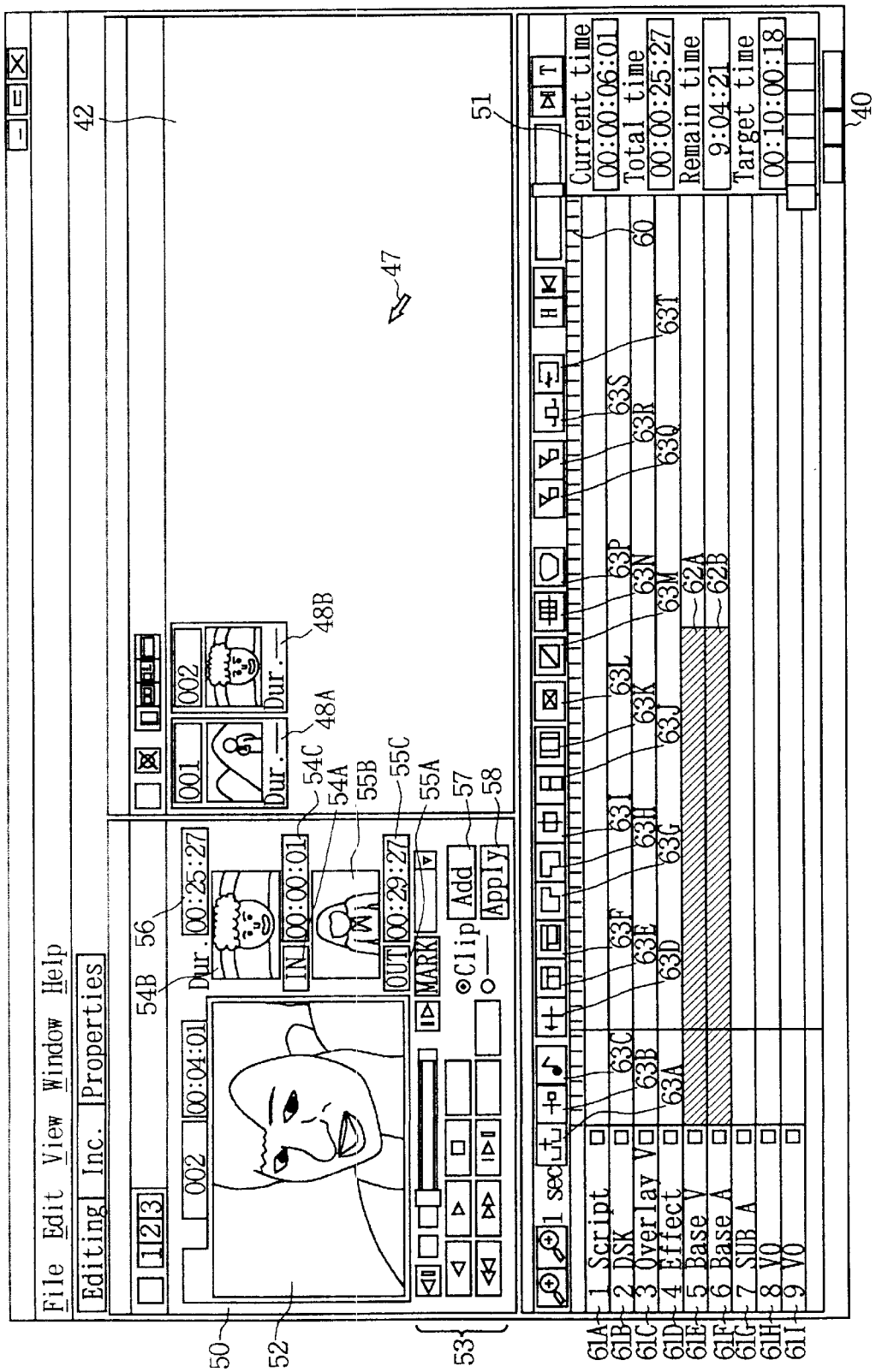
Figure 7:
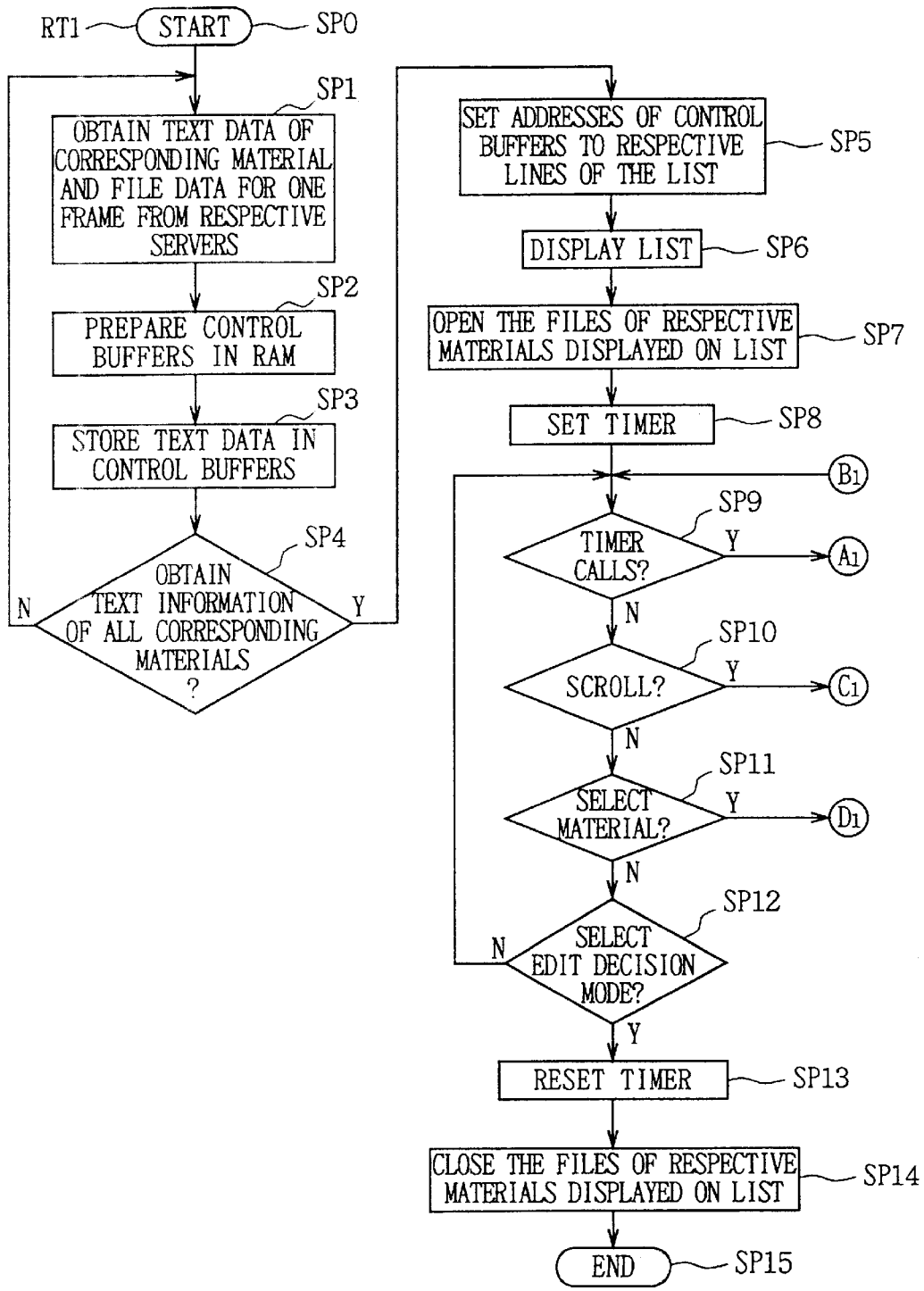
FIGS. 7 to 10 are flow charts showing a list display window procedure according to the first embodiment.
Figure 8:
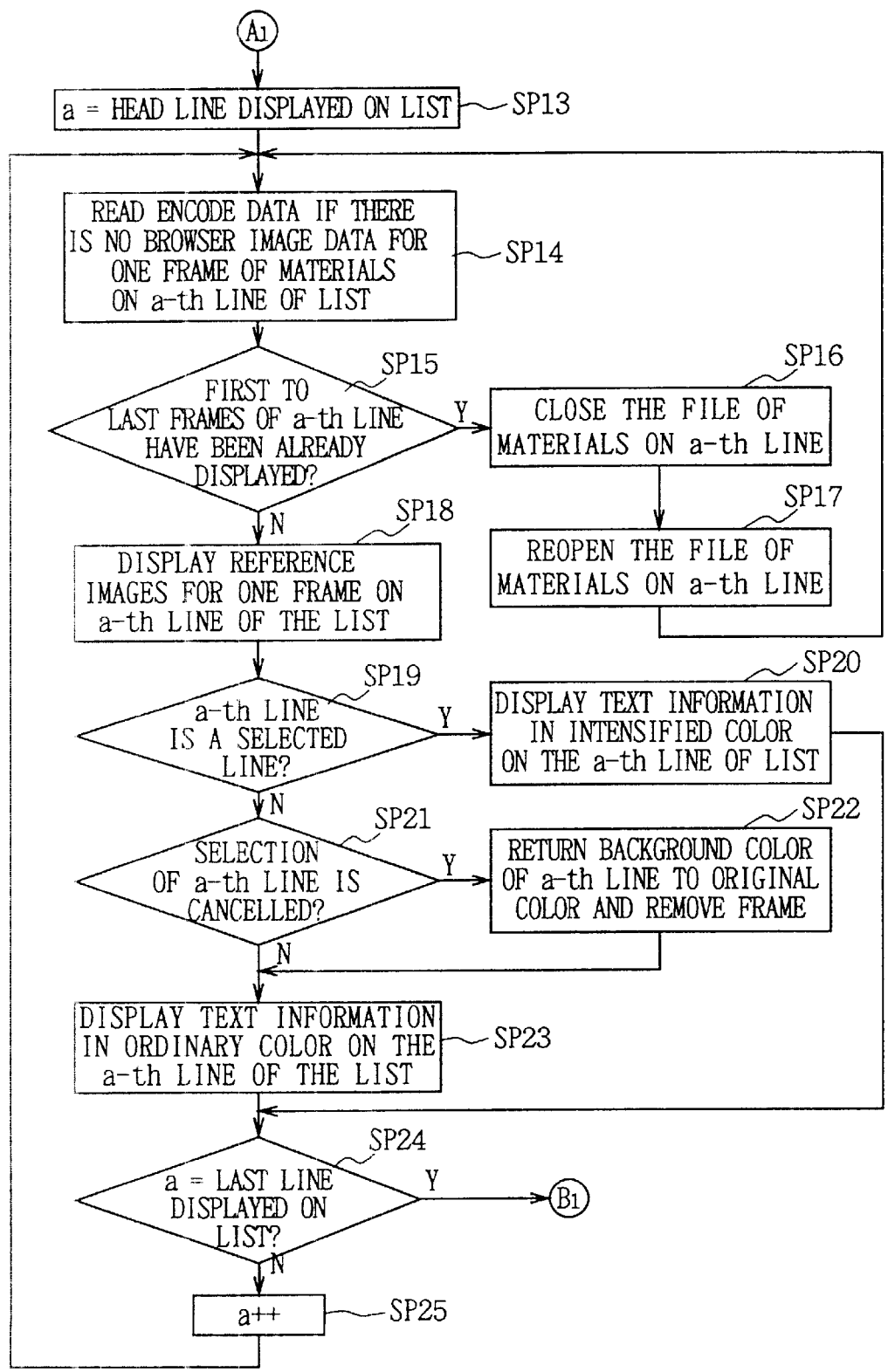
Figure 9:
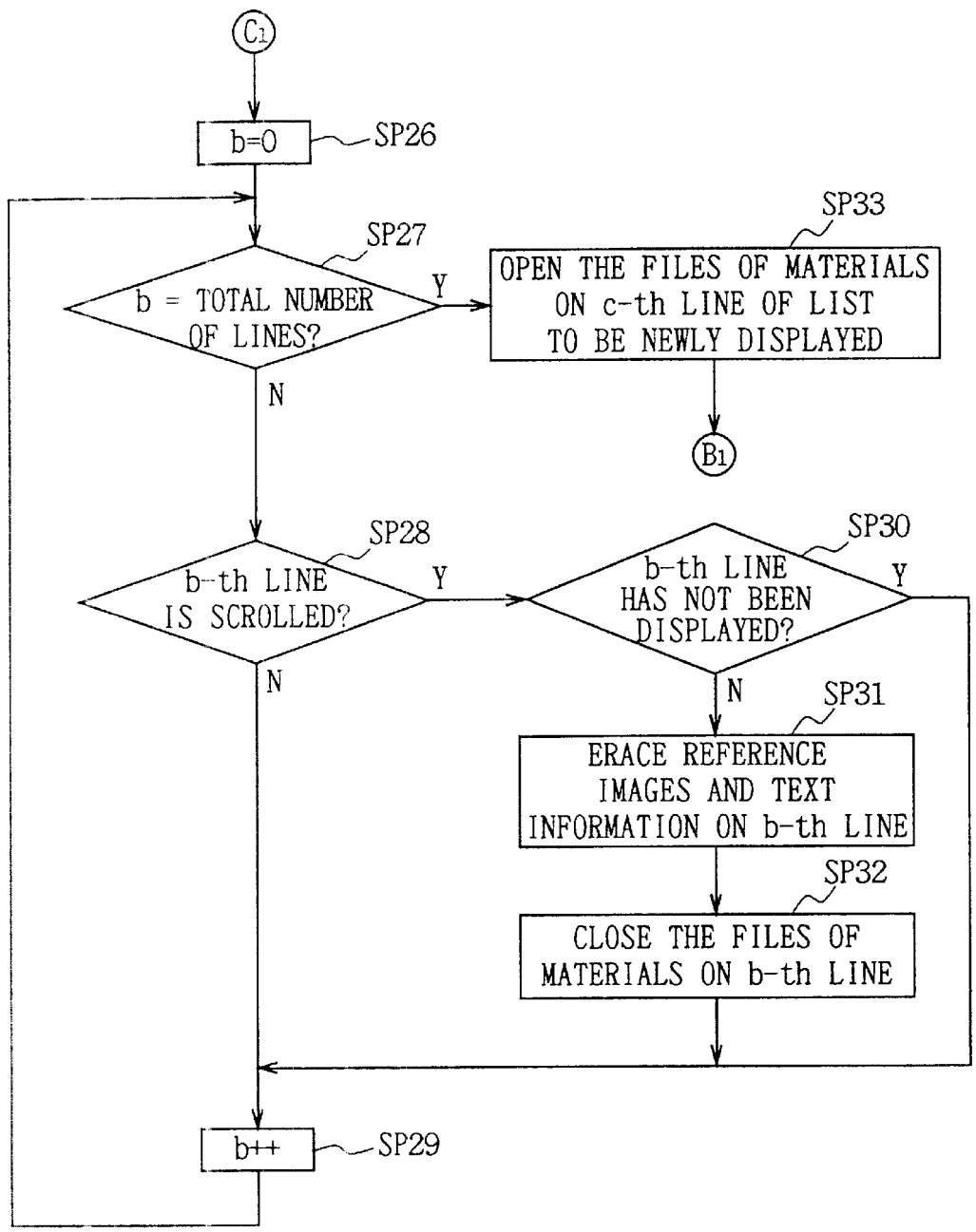
Figure 10:
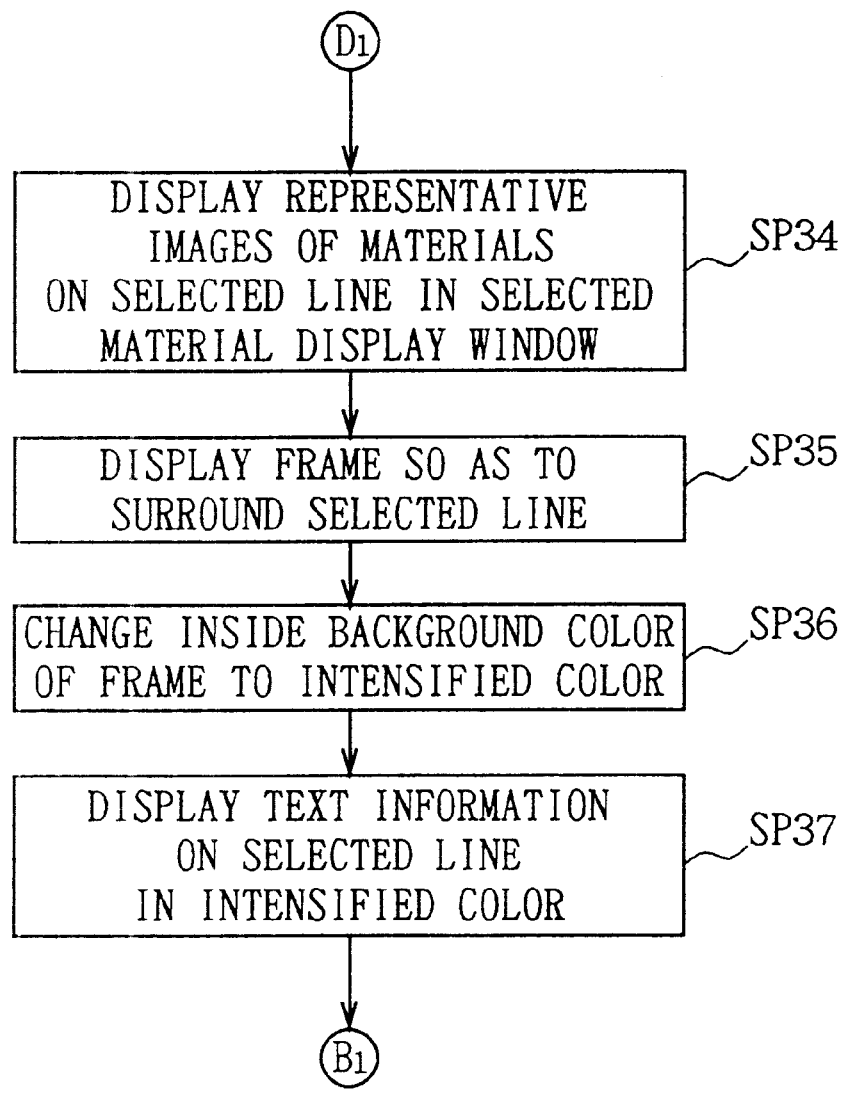

Thus, the operator can sequentially select the desired video and audio materials from the list displayed in the list display window 41 by such an operation. After the operator selects all the desired video and audio materials, he/she double-clicks the representative images 48A and 48B of the desired video and audio material displayed in the selected material display window 42, so that an edit decision list creating mode is selected to display a clip forming window 50 and a time line window 51 as illustrated in FIG. 6 in place of the list display window 41.

In this case, the clip forming window 50 is a window for designating desired parts of the video and audio material as clips. As stated above, the desired representative images 48A and 48B out of a plurality of video and audio materials of which the representative images 48A and 48B are displayed in the selected material display window 42 are double-clicked, so that the representative images 48A and 48B of the video and audio material can be displayed in a image display part 52.

Further, in the clip forming window 50, operating buttons 53 displayed below the image display part 52 are clicked, so that the representative images 48A and 48B of the video and audio material are displayed in the image display part 52. In this case, the video server 3 (see FIG. 1) can perform an operation corresponding to the operating buttons 53 relative to the above described video and audio material of which the representative images 48A and 48B are displayed in the display part 52, and video images being reproduced at this time are displayed in the image display part 52.

Then, the operator clicks an in-point button 54A and an out-point button 55A while visually recognizing the images displayed in the image display part 52 so as to designate an in-point and an out-point. The frame image and the time code of the designated in-point are respectively displayed in an in-point image display part 54B and an in-point time code display part 54C, and the frame image and the time code of the designated out-point are respectively displayed in an out-point image display part 55B and an out-point time code display part 55C. In addition to this, the length from the in-point to the out-point (in other words, the length of a clip) is displayed in a duration display part 56.

Further, the operator designates the in-point and the out-point in this way, and then clicks an add button 57 so as to register images from the in-point to the out-point of the video and audio material as a clip separately from the original video and audio material. The frame image of the in-point of the clip registered in such a manner (referred to as an in-point image, hereinafter) is displayed in the selected material display window 42 separately from the representative images 48A and 48B of the original video and audio material.

Furthermore, the operator designates the in-point and the out-point as mentioned above, and then, clicks an apply button 58 so as to register a part from the in-point to the out-point of the video and audio material as a clip in place of the original video and audio material. The in-point image of the clip registered in such a manner is displayed in the selected material display window 42 instead of the representative images 48A and 48B of the original video and audio material.

On the other hand, in the GUI screen 40, after the clips of a plurality of video and audio materials are registered in this manner, an edit decision list can be created by employing the time line window 51 in accordance with a method mentioned below.

At first, the cursor 47 is moved to the in-point image of a desired clip in the selected material display window 42, the button of the mouse 29 is pressed down, the cursor 47 is moved, under this state, to a desired position on a video track 61E of a plurality of tracks 61A to 61I provided along a time scale 60 serving as an index in the time line window 51 and then, the button of the mouse 29 is released.

Consequently, in the video track 61E, a bar 62A of a prescribed color having the length corresponding to the length of a material of the clip designated as described above is displayed with the position of the then cursor 47 as the head. Further, at this time, when the original video and audio material being the origin of the clip has sound, a bar 62B with the same length as that of the bar 62A displayed on the video track 61E is also displayed at the same position on the time scale 60 on an audio track 61F.

Then, the operator repeatedly carries out the operations as mentioned above, so that the bars 62A and 62B are sequentially displayed on the video track 61E and the audio track 61F so as to be continued on the time scale 60 from a first time code ("00.00.00:00") to a desired time code (that is, for desired duration of time) on the time scale 60.

Here, the fact that the bars 62A and 62B are displayed on the video track 61E and the audio track 61F in the time line window 51 means that the images and sound of the clip corresponding to the bars 62A and 62B are displayed and outputted at the time represented on the time scale 60 at the time of outputting the edited video images and sound. Thus, the edit decision list that sequentially specifies clip images or sound to be displayed as edited images or to be outputted as edited sound can be created by the above-mentioned operations.

Now, in the case of creating the edit decision list in such a way, when it is desired to apply a special effect processing to the images at the time of switching a first clip image to a second image, a special effect selecting button 63M is clicked from a plurality of buttons 63A to 63T for selecting various kinds of processes which are provided on the upper stage of the time line window 51.

As a result, a prescribed window (not shown) on which a plurality of icons (referred to as effect icons, hereinafter) indicating the contents of various sorts of executable special effect processes are displayed can be opened on the GUI screen 40. Then, the icon corresponding to a desired special effect process is displayed so as to stick to an effect track 61D by a drag and drop operation so that the icon is located at the same position on the time scale 60 as the border on the bar 62A between the first and second clips displayed on the video track 61E of the time line window 51.

Thus, an instruction that the special effect process corresponding to the effect icon stuck to the effect track as mentioned above in the joined part of the video images of the first and second clips is to be carried out can be inputted.

As stated above, in the edit decision list creating device 1, the operator selects desired video and audio materials out of a plurality of video and audio materials stored in the video server 3 by using the client computer 3 and designates an in-point and out-point of them, so that the edit decision list can be created based on the clips.

(1-4) Procedure of CPU in List Display Window

The CPU 20 of the client computer 3 performs the various kinds of processes as mentioned above in the list display window 51 on the GUI screen 40 in accordance with a list display window procedure RT1 shown in FIGS. 7 to 10.

In practice, when the operator selects the material selection mode and inputs a keyword and then, inputs the search instruction of the video and audio materials corresponding thereto, the CPU 20 starts the list display window procedure RT1 at step SP0. At following step SP1, the CPU 20 makes access to the data base server 4 (see FIG. 1) to read the text data D4 of a video and audio material corresponding thereto. Further, the CPU 20 also makes access to the video server 3 (see FIG. 1) to read the browser image data D3 or the encode data D2 of the video and audio material for one frame.

Then, the CPU 20 advances to step SP2 to prepare control buffers for each line in the RAM 22 for controlling as to which line (also including lines not displayed on the screen) of the list corresponds to the video and audio material. After that, the CPU moves to step SP3 to store the text data D4 acquired at step SP2 in corresponding control buffer prepared at step SP1.

Subsequently, the CPU 20 advances to step SP4 to decide whether or not the text data D4 of all the corresponding video and audio materials is obtained from the data base server 4. When a negative result is obtained, the CPU 20 returns to step SP1 to repeat the loop of steps SP1–SP2–SP3–SP4–SP1 until an affirmative result is obtained at step SP4.

Then, when the affirmative result is obtained at step SP4, the CPU 20 advances to step SP5 to coordinate the each line of the list to the address of each control buffer. After that, the CPU 20 advances to step SP6 to display the list (a part thereof) as shown in FIG. 4 in the list display window 41 of the GUI screen 40.

Subsequently, the CPU 20 proceeds to step SP7 to make access to the video server 3 (see FIG. 1) in order to open the file of each video and audio material being in the list displayed in the list display window 41 at this time. Further, the CPU 20 advances to step SP8 to set the timer 24 (see FIG. 3) to a frame cycle for displaying the reference images 43A to 43F composed of the dynamic browser images or the dynamic images to be displayed in the list display window 41 of the GUI screen 40.

Then, the CPU 20 advances to step SP9 and then, sequentially and repeatedly decides at steps SP9 to SP12 whether or not the timer 24 calls, whether or not the scroll-up button 46A (see FIG. 4) or the scroll-down button 46B (see FIG. 4) is pressed down, whether or not the video and audio material is selected, and whether or not the edit decision list creating mode is selected (whether or not the representative images 48A and 48B displayed on the selected material display window 42 are double clicked), respectively.

When the affirmative result is obtained at step SP9, the CPU 20 advances to step SP13 (see FIG. 8) to store a line number (called a, hereinafter) indicating which line from the first of the list corresponds to the head line of the list displayed in the list display window 41. After that, the CPU 20 advances to step SP14 to read the browser image data D3 or the encode data D2 of the video and audio material for one frame to be displayed on the line of the stored value "a" from the video server 3.

Next, the CPU 20 moves to step SP15 to decide whether or not the reference images 43A to 43F are already displayed up to last frame on the a-th line of the list. When an affirmative result is obtained, the CPU 20 advances to step SP 16 to make access to the video server 3 and closes the file of the video and audio material on the a-th line. At next step SP17, the CPU 20 makes access again to the video server 3 to reopen the file of the video and audio material on the a-th line and returns to step SP14.

On the contrary, when an negative result is obtained at step SP15, the CPU 20 moves to step SP18 to display the reference images 43A to 43B based on the browser image data D3 or the encode data D2 for one frame, which is read from the video server 3 at step SP14, at the corresponding positions on the a-th line of the list. Then, the CPU 20 advances to step SP19 to decide whether or not the a-th line is a line in which the corresponding video and audio material is selected.

When an affirmative answer is obtained at step SP19, the CPU 20 moves to step SP20 to display the frame 49 (see FIG. 5) so as to surround the a-th line of the list and changes the inside background color to a predetermined color and displays the corresponding text information 44A to 44F with an intensified color, and then, moves to step SP23.

On the contrary, when a negative result is obtained at step SP19, the CPU 20 advances to step SP21 to decide whether or not the a-th line is a line in which the selection of the corresponding video and audio material has been cancelled.

Then, when an affirmative answer is obtained at step SP21, the CPU 20 moves to step SP 22 to erase the frame 49 being displayed so as to surround the a-th line and to return the background color to an original color, and then, proceeds to step SP23.

On the contrary, when a negative answer is obtained at step SP21, the CPU 20 moves to step SP23 to display the text information 44A to 44F with an ordinary color on an n-th line of the list, and then, advances to step SP24 to decide whether or not the a-th line is the last line of the list to be displayed on the screen.

Then, when a negative result is obtained at step SP24, the CPU 20 adds one to the stored line number a, and then, returns to step SP14 to repeat the loop of step SP14 to steps SP24–SP14 until the affirmative result is obtained at step SP24.

Thus, the CPU 20 displays the reference images 43A to 43F and the text information 44A to 44F of the video and audio material corresponding to the last line of the list displayed on the screen. Then, when the affirmative result is obtained at step SP24, the CPU 20 returns to step SP9 to repeat the loop of step SP9 to steps SP12–SP9 until an affirmative result is obtained at any of step SP9 to step SP12.

On the other hand, when the affirmative result is obtained at step SP10, the CPU 20 advances to step SP26 (see FIG. 9) to store a value "0", and then moves to step SP27 to decide whether or not a value (called b, hereinafter) stored at that time coincides to the total number of lines (also including parts which are not displayed on the screen).

When a negative result is obtained at step SP27, the CPU 20 moves to step SP28 to decide whether or not the b-th line of the list is a line which is not displayed on the screen by a scrolling operation. When a negative result is obtained, the CPU 20 moves to step SP29 to add one to the stored value b, and then, returns to step SP27.

Then, the CPU 20 repeats the loop of steps SP27–SP28–SP29–SP27 to detect a line which is not displayed on the screen by scrolling the list. Thus, when an affirmative result is obtained at step SP 28, the CPU 20 moves to step SP30 to decide whether or not the b-th line is a line which has not been displayed.

Consequently, when an affirmative result is obtained at step SP30, the CPU 20 advances to step SP29. On the contrary, when a negative result is obtained, the CPU 20 moves to step SP31 to erase the reference images 43A to 43F for one frame and the text information 44A to 44F on the b-th line being displayed on the screen at that time from the screen, and then, advances to step SP32 to make access to the video server 3 to close the file of the video and audio material on the b-th line. After that, the CPU 20 moves to step SP29.

In such a manner, the CPU 20 sequentially decides whether or not each of all the lines of the list is a line which will not be displayed by a scrolling operation regardless of lines which are displayed on the screen or lines which are not displayed on the screen, at step SP27 to step SP32. As for the lines which will not be displayed on the screen, the CPU 20 erases from the screen the reference images 43A to 43F for one frame and the text information 44A to 44F thereof which are displayed on the screen at that time.

When an affirmative result is obtained at step SP27 because of completing the above described decision for all the lines of the list, the CPU 20 advances to step SP33 to make access to the video server 3 so as to open the file of the video and audio material on a c-th line of the list to be newly displayed on the screen, and then, returns to step SP9. After that, the CPU 20 repeats the loop of step SP9 to steps SP12 to SP9 until an affirmative result is obtained at any of step SP9 to step SP12.

Note that, the above mentioned processes are repeatedly carried out for the number of lines of the list to be newly displayed on the screen. As for the lines to be newly displayed on the screen, the timer 24 (see FIG. 3) as described above calls to sequentially display the reference images 43A to 43F for one frame and the text information 44A to 44F on the screen.

On the other hand, when the affirmative result is obtained at step SP11, the CPU 20 advances to step SP34 (see FIG. 10) to make access to the video server 3 in order to make it display the representative images 48A and 48B of the video and audio material on a selected line in the selected material display window 42.

Then, the CPU 20 proceeds to step SP35 to display the frame 49 (see FIG. 5) so as to surround the selected line and moves to subsequent step SP36 to change the inside background color of the frame 49 to an intensified color.

Further, the CPU 20 displays the text information 44A to 44F on the selected line with the intensified color at next step SP37 and then, returns to step SP9. After this, the CPU 20 repeats the loop of step SP9 to steps SP12–SP9 until an affirmative result is obtained at any of step SP9 to step SP12.

On the other hand, when the affirmative result is obtained at step SP12, the CPU 20 advances to step SP38 to reset the timer 24 (see FIG. 3). At next step SP39, the CPU 20 makes access to the video server 3 to close the file of the video and audio material on each line of the list which is displayed on the screen at that time.

Then, the CPU 20 closes the list display window 41 at next step SP40, and then, advances to step SP41 to finish the list display window procedure RT1.

(1-5) Operation and Effects of Embodiment

According to the above mentioned constitution, in the client computer 5 of the edit decision list creating device 1, the reference images 43A to 43F and the text information 44A to 44F of the corresponding video and audio materials are displayed during the material selection mode in the list form in the list display window 41 of the GUI screen 40. Thus, the operator can select the desired video and audio materials based on the reference images 43A to 43F and the text information 44A to 44F being displayed on the screen.

Therefore, according to the edit decision list creating device 1, for example, even when there are a plurality of video and audio materials having the similar text information 44A to 44F, desired video and audio materials can be selected with ease based on the reference images 43A to 43F corresponding thereto.

Further, in the edit decision list creating device 1, since the dynamic browser images or the dynamic images are displayed on the GUI screen 40 as the reference images 43A to 43F of the video and audio materials, the operator can easily-understand the contents of the video and audio materials, and therefore, desired video and audio materials can be more readily selected.

According to the above mentioned construction, since the reference images 43A to 43F and the text information 44A to 44F of the corresponding video and audio materials are displayed in the list display window 41 of the GUI screen 40, and the desired video and audio materials can be selected based on these reference images 43A to 43F and text information 44A to 44F being displayed on the screen, the operator can easily select the desired video and audio materials. Therefore, the edit decision list creating device can be realized by which the operating efficiency of a selection work for video and audio materials can be remarkably improved.

(2) Second Embodiment (2-1) Constitution of Edit Decision List Creating Device and GUI Screen According to Second Embodiment In FIG. 1, an edit decision list creating device 70 according to a second embodiment is constructed in a manner similar to that of the edit decision list creating device 1 according to the first embodiment except a list form displayed on a list display window of a below described GUI screen which is displayed, upon material selection mode, on the display 31 (see FIG. 3) of a client computer 71 and the processes of the CPU 20 (see FIG. 3) in the list display window.

Figure 11:
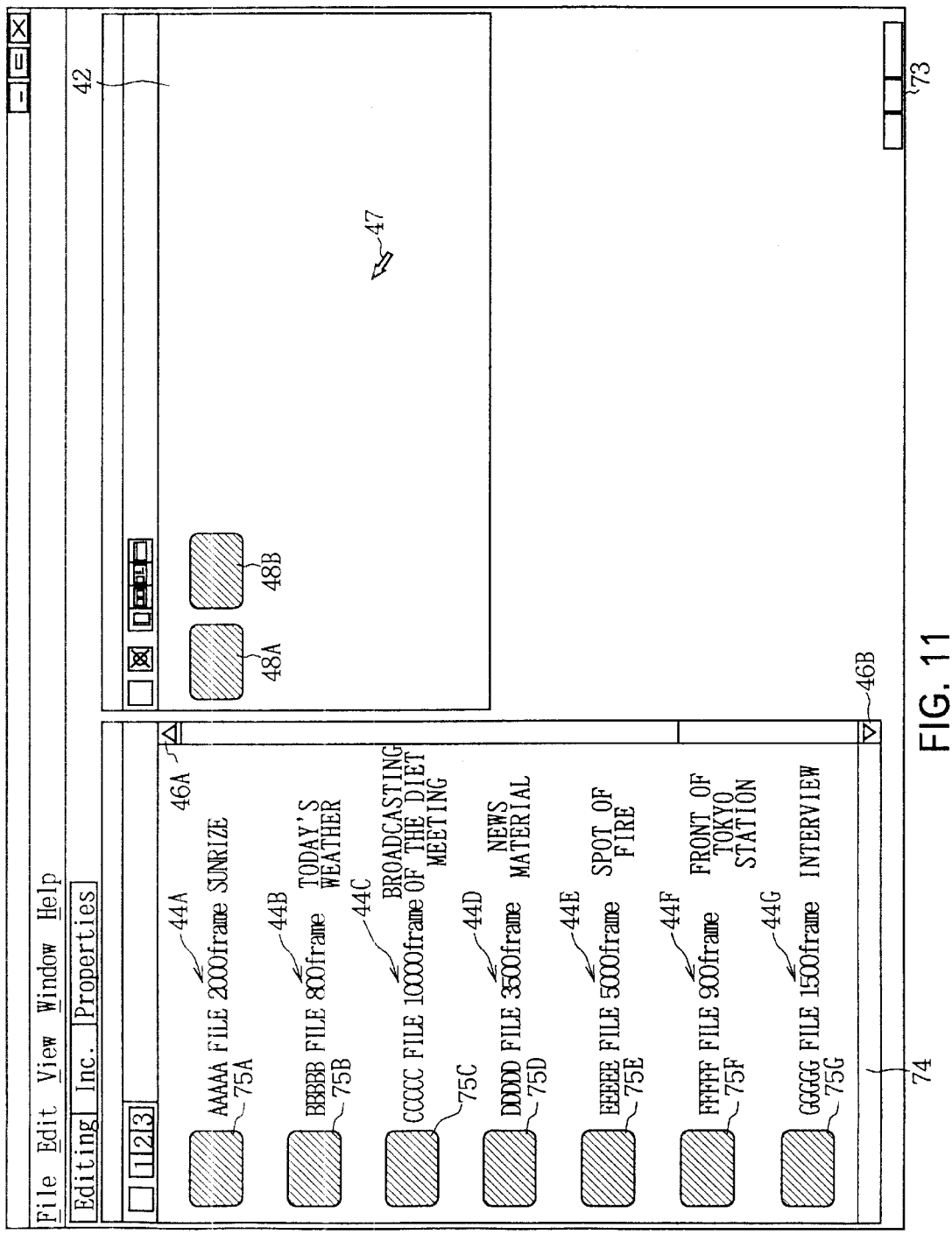
FIGS. 11 to 13 are diagrammatic views showing the configuration of a GUI screen in a second embodiment.

In this case, in the edit decision list creating device 70, a GUI screen 72 as illustrated in FIG. 11 in which the same reference numerals are applied to parts corresponding to FIG. 4 is displayed on the display 31 of the client computer 71 at the time of the material selection mode.

In practice, on the GUI screen 73, the static browser images or the static images (referred to reference images 75A to 75G, hereinafter) of video and audio materials corresponding to a keyword which is previously inputted by an operator and text information 44A to 44G corresponding thereto are displayed in a list display window 74 in a list form.

Figure 12:
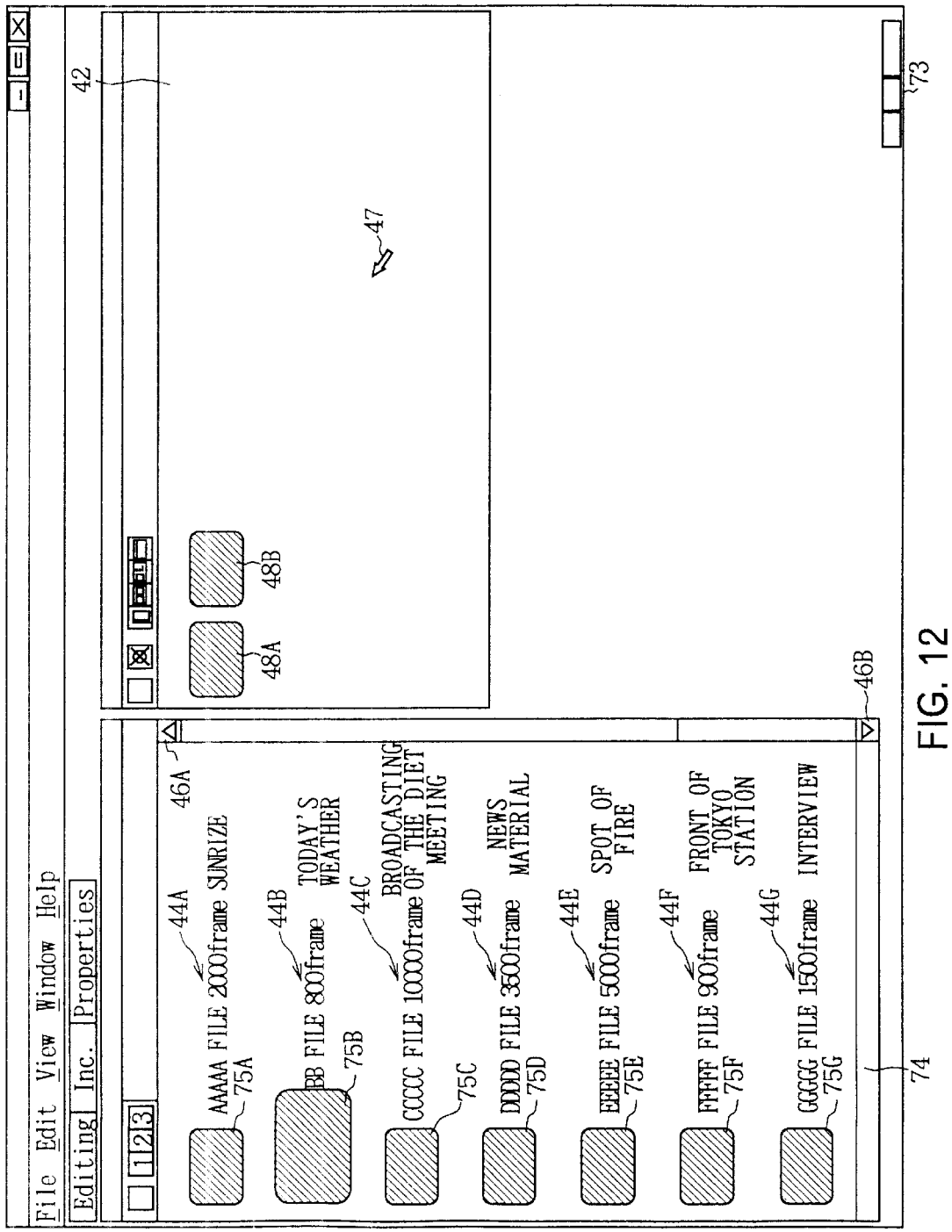

In the GUI screen 73, when a cursor 47 is moved onto the reference image 75A to 75G on any line by operating a mouse, the reference image 75A to 75G is displayed in enlarged forms as the dynamic browser image or the dynamic image, as shown in FIG. 12. Therefore, the operator can sequentially visually confirm the dynamic browser images or the dynamic images of the video and audio materials displayed in the list form.

Figure 13:
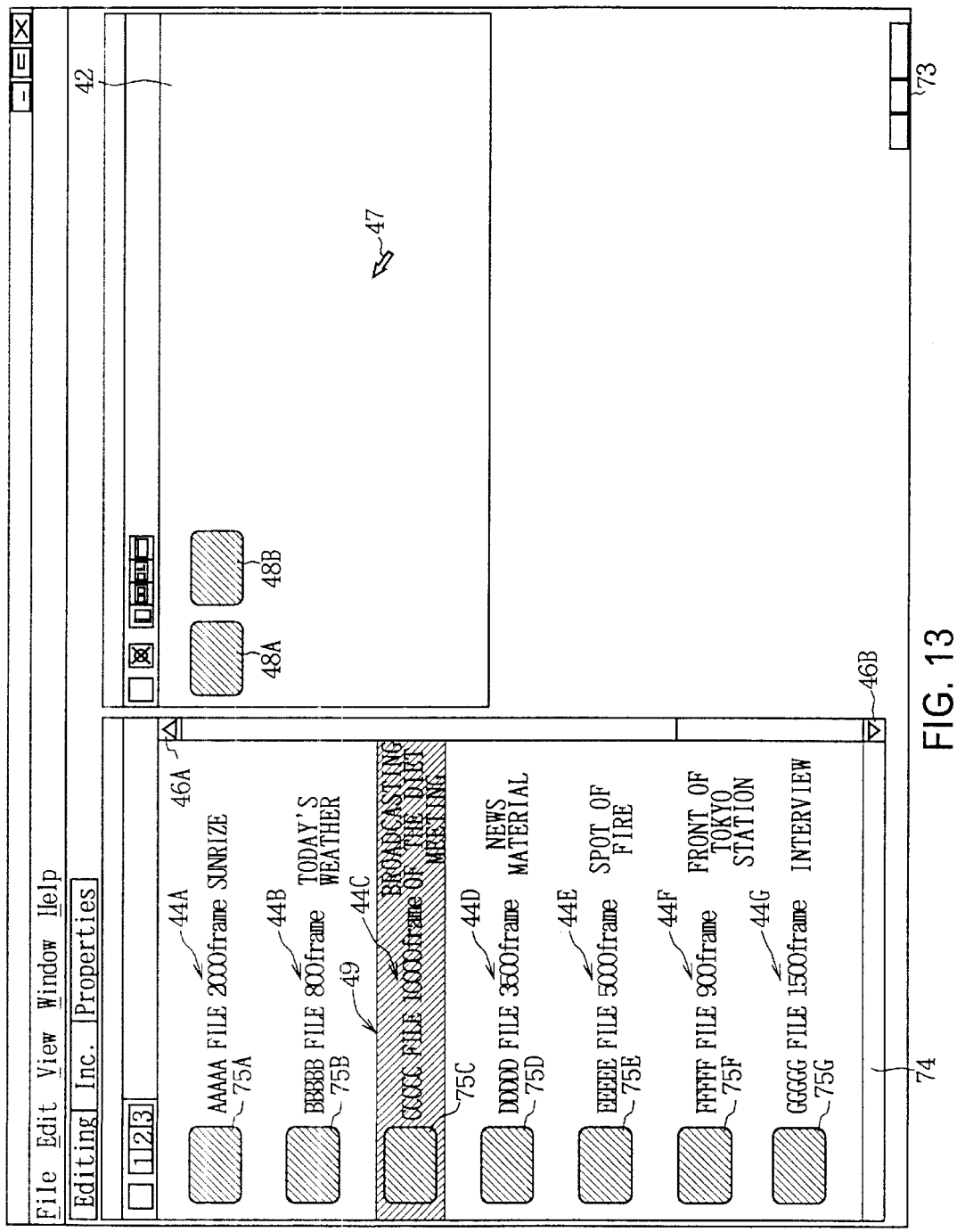
Figure 14:
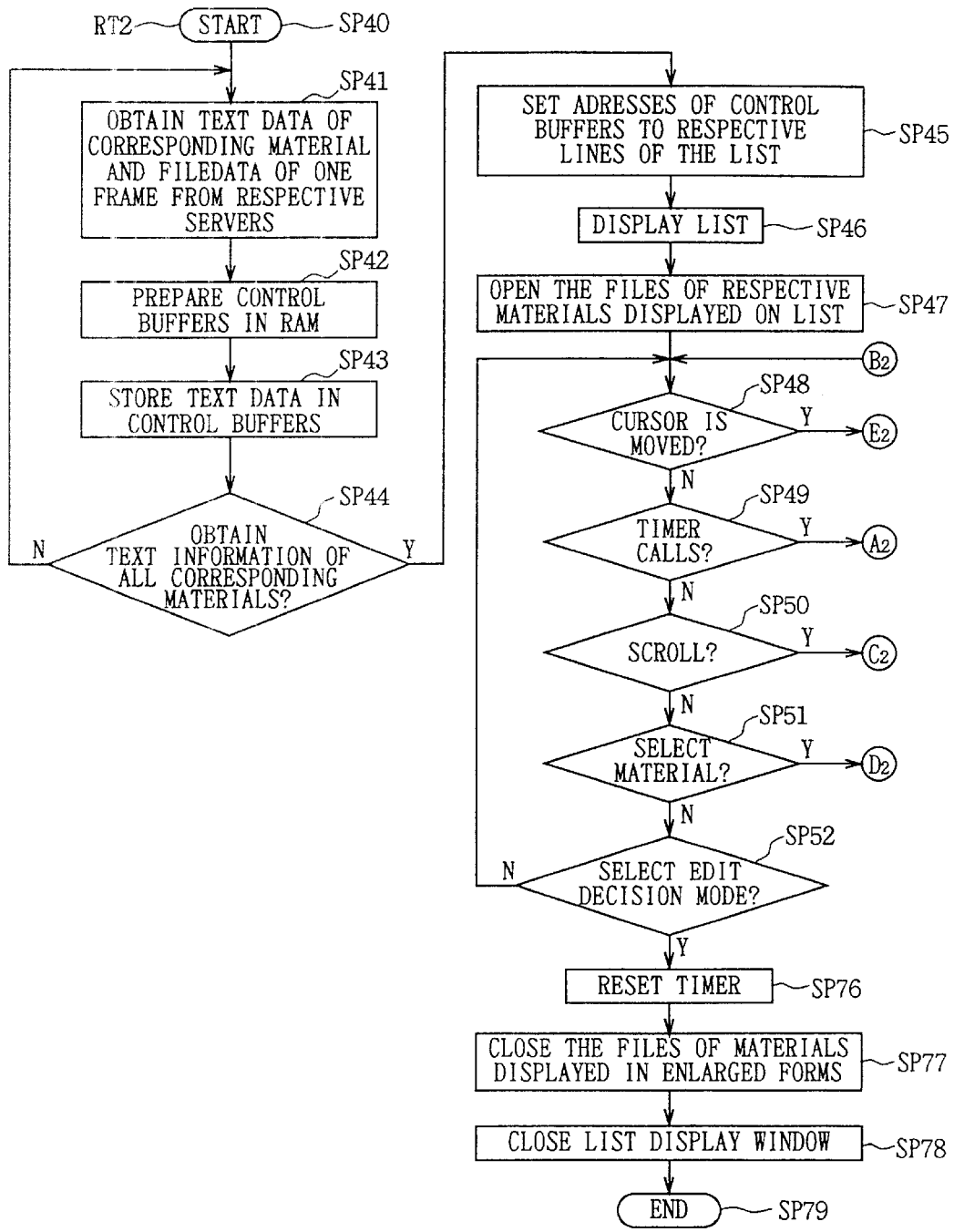
FIGS. 14 to 18 are flow charts showing a list display window procedure according to the second embodiment.
Figure 15:
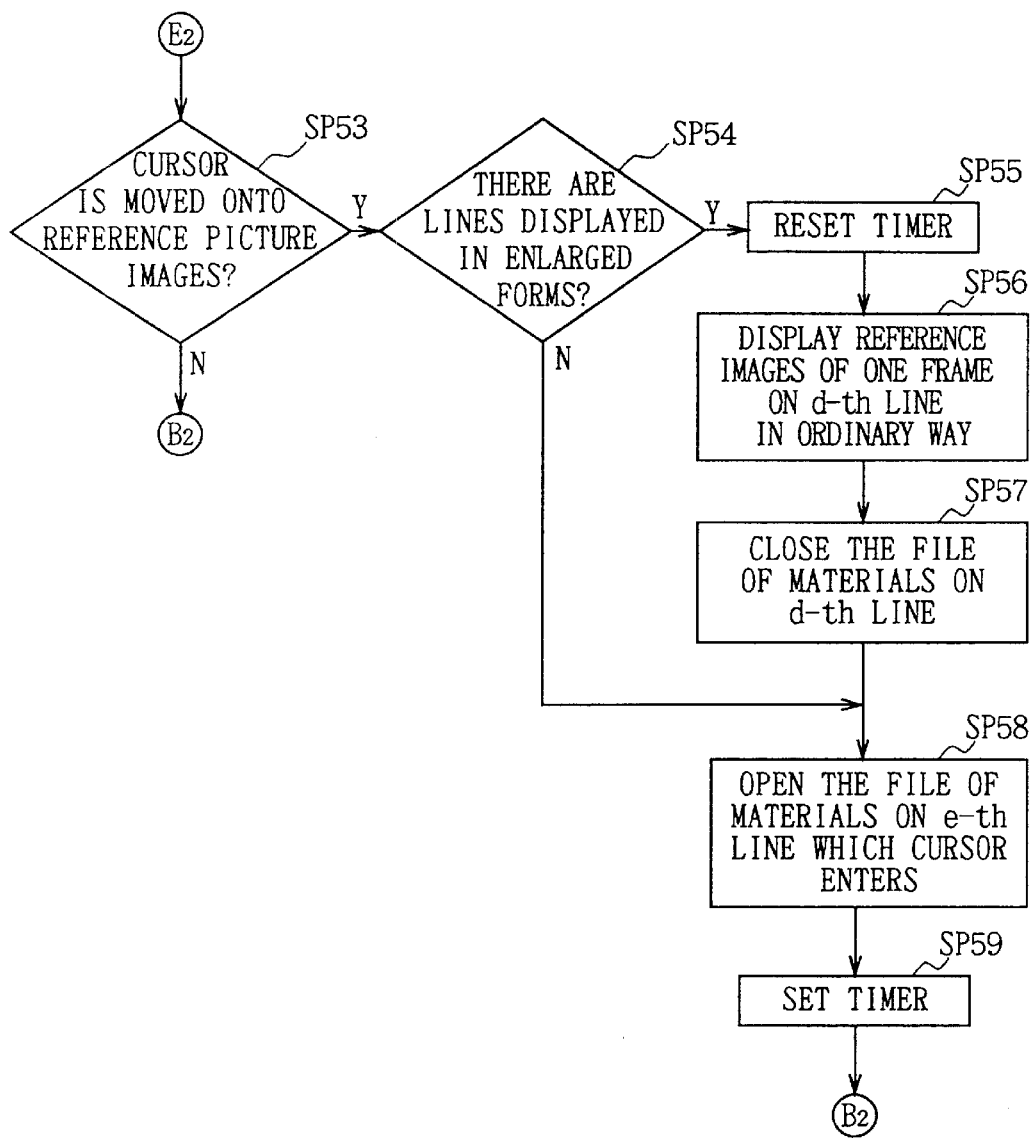
Figure 16:
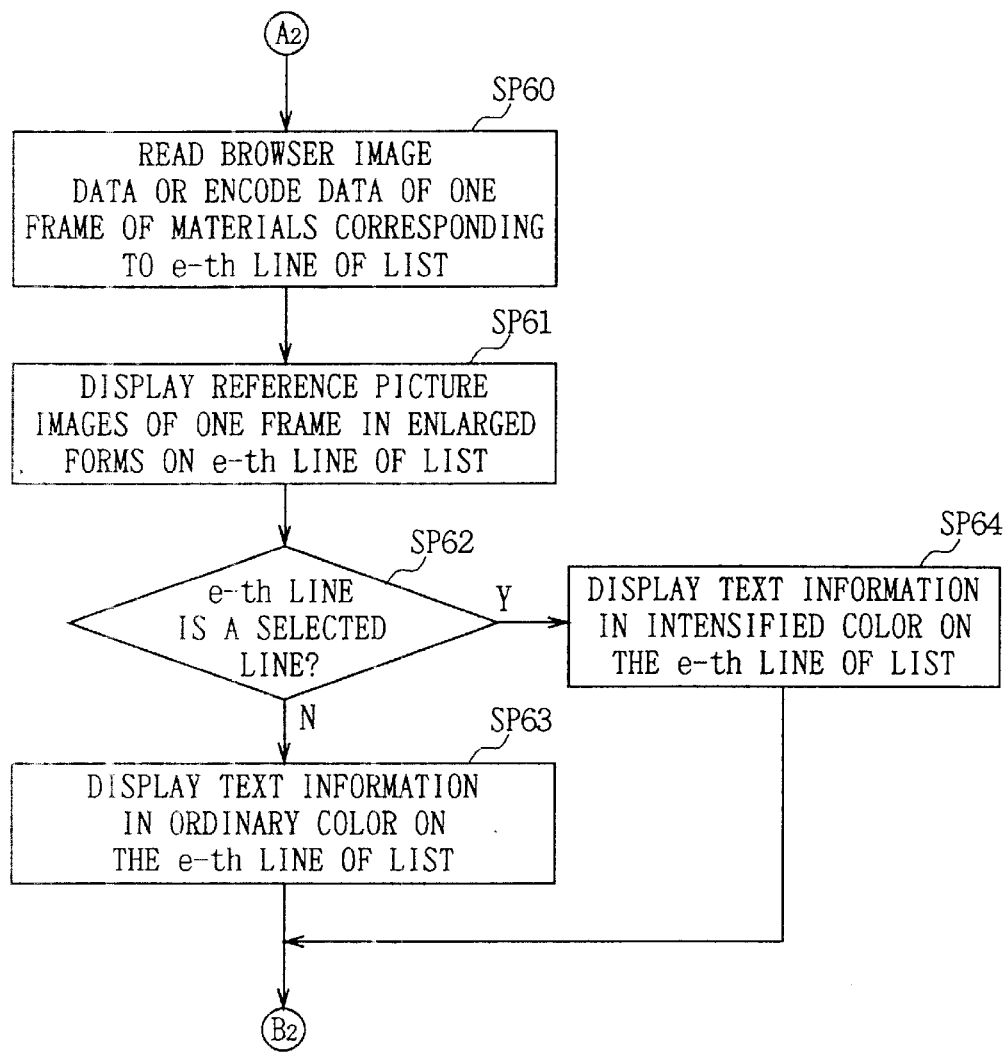
Figure 17:
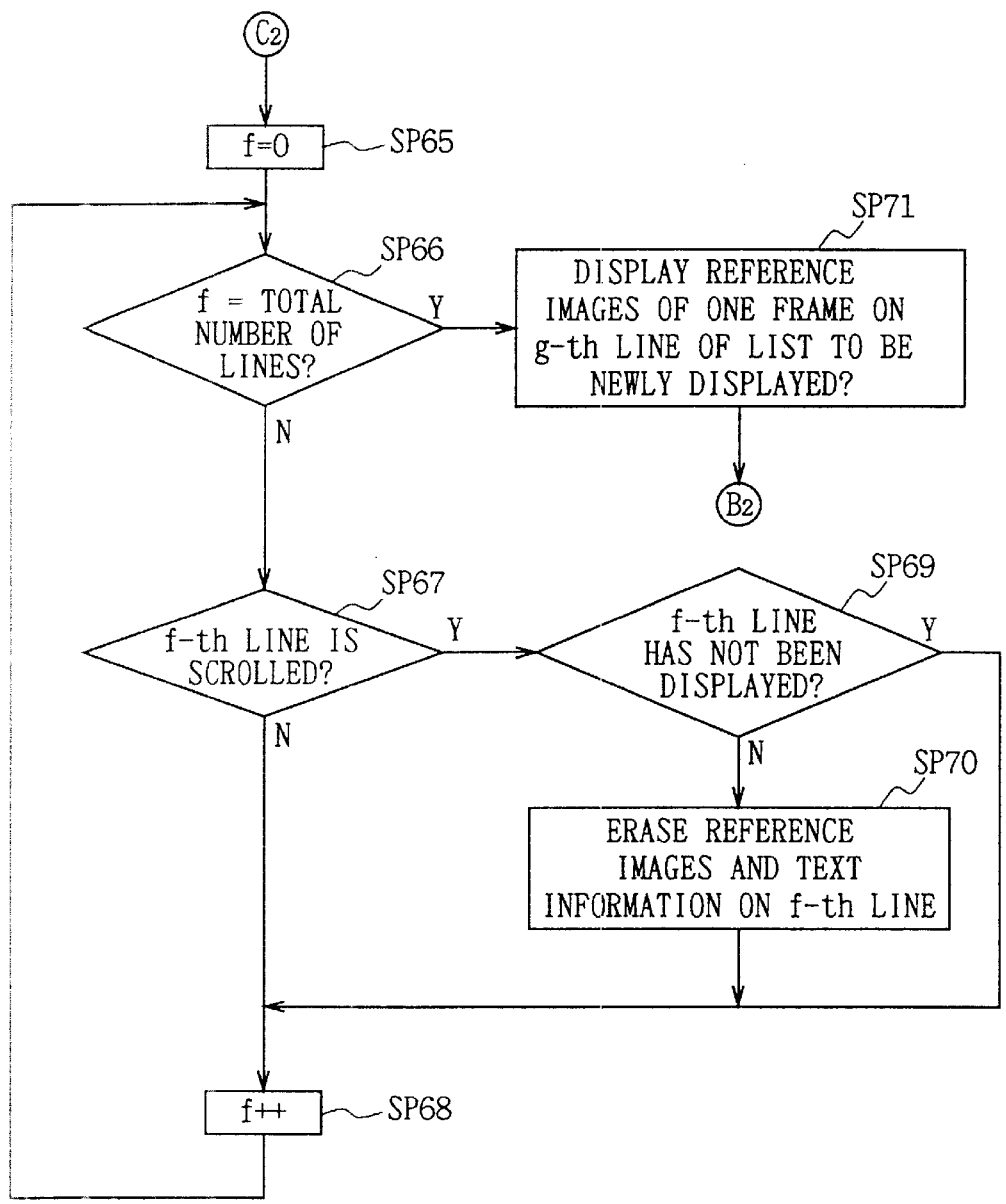

In the GUI screen 73, desired video and audio materials can be selected in the same manner as that of the first embodiment. At this time, in the list display window 74 of the GUI screen 73, a frame 76 is displayed so as to surround the line of the list corresponding to the selected video and audio material, as illustrated in FIG. 13 and moreover, changes the inside background color of the frame to an emphasized color and displays the text information 44A to 44G on the line in an emphasized color.

Note that, when the selection of the video and audio material is cancelled, the line of the corresponding list being displayed on the list display window 74 may be clicked. As a result, the frame 76, which is being displayed so as to surround the line, is erased from the screen, the background color returns to an ordinary color and the text information is displayed in an ordinary color. Further, at this time, the representative images 48A and 48B of the video and audio material being displayed in a selected material display window 42 are also erased from the screen.

(2-2) Procedure of CPU in List Display Window

The CPU 20 of the client computer 71 carries out various kinds of processes described above in the list display window 74 of the GUI screen 73 in accordance with a list display window procedure RT2 shown in FIGS. 14 to 18.

In practice, when the material selection mode is selected and the keyword is inputted by the operator, and then, a search instruction for the video and audio materials corresponding thereto is inputted, the CPU 20 starts the list display window procedure RT2 at step SP40. The CPU 20 sequentially performs the processes from next step SP41 to step SP47 in a similar manner to that of step SP1 to step SP7 of the list display window procedure RT1 in the first embodiment.

Then, the CPU 20 advances to step SP49 to sequentially and repeatedly decide at step SP49 to step SP52 respectively whether or not the cursor 47 is moved, whether or not the timer 24 (see FIG. 3) calls, whether or not a scroll-up button 46A or a scroll-down button 46B is pressed down, whether or not the video and audio materials are selected and whether or not an edit decision list creating mode is selected.

When an affirmative result is obtained at step SP48, the CPU 20 advances to step SP53 (see FIG. 15) to decide whether or not the cursor 47 is moved onto any of the reference images 75A to 75G of the list being displayed in the list display window 74. When a negative result is obtained, the CPU 20 returns to step SP49. On the contrary, when an affirmative result is obtained, the CPU 20 advances to step SP54 to decide whether or not there exists a line having the reference image 75A to 75G displayed in enlarged forms at that time.

Then, when a negative result is obtained at step SP54, the CPU 20 moves to step SP58. On the contrary, when an affirmative result is obtained, the CPU 20 advances to step SP55 to reset the timer 24 (see FIG. 3), and then, advances to step SP56. At step 56, the CPU 20 makes access to the video server 3 (see FIG. 1) to read the browser image data D3 or the encode data D2 of the video and audio materials on a d-th line for one frame and to display browser images or frame images based on the browser image data D3 or the encode data D2 in ordinary sizes as the reference image 75A to 75G at a predetermined position in the corresponding line of the list.

Next, the CPU 20 advances to step SP57 to make access to the video server 3 in order to close the file of the video and audio material on the line in which the reference image 75A to 75G are displayed in enlarged forms, and then, moves to step SP58 to open the file of the video and audio material on a line in which the cursor 47 newly exists.

Then, the CPU 20 sets, at the following step SP59, the timer 24 to the value of the frame cycle of the reference image 75A to 75G (dynamic browser image or dynamic image) to be displayed in enlarged forms, and then returns to step SP49. After that, the CPU 20 repeats the loop of steps SP49 to SP52–SP49 until an affirmative result is obtained at any of step 49 to step SP52.

On the other hand, when the affirmative result is obtained at step SP49, the CPU 20 advances to step SP60 (see FIG. 16) to make access to the video server 3 in order to read the browser image data D3 or the encode data D2 for one frame of the video and audio material corresponding to the line of the list displayed in the list display window 71 in which the reference image 75A to 75G is displayed in enlarged forms. At next step SP61, the CPU 20 displays the browser image or the frame image for one frame based on the read browser image data D3 or encode data D2 in enlarged forms as the reference image 75A to 75G at prescribed position in a corresponding line of the list display window 71.

Then, the CPU 20 proceeds to step SP62 to decide whether or not the line on which the reference image 75A to 75G is displayed in enlarged forms is a line in which the corresponding video and audio material has been already selected.

When a negative result is obtained at step SP63, the CPU 20 moves to step SP64 to display the corresponding text information 44A to 44G in the line in an ordinary color, and then, returns to step SP49. On the contrary, when an affirmative result is obtained, the CPU 20 advances to step SP64 to represent the corresponding text information 44A to 44G in the line in an emphasized color, and then, returns to step SP49. Thereafter, the CPU 20 repeats the loop of steps SP49 to SP52–SP49 until an affirmative result is obtained at any of step SP49 to step SP52.

On the other hand, when the affirmative result is obtained at step SP50, the CPU 20 advances to step SP65 (see FIG. 17) to store a value "0", and then moves to step SP66. At step SP66, the CPU 20 decides whether or not the value (referred to as f, hereinafter) stored at that time coincides to the total number of lines (also including lines which are not displayed on the screen).

When an affirmative result is obtained at step SP66, the CPU 20 moves to step SP67 to decide whether or not a f-th line of the list is a line which is not displayed by a scrolling operation. When a negative result is obtained, the CPU 20 moves to step SP68 to add one to the stored value f, and then returns to step SP66.

Then, the CPU 20 repeats the loop of steps SP66–SP67–SP68–SP66 so that it detects a line which is not displayed on the screen by scrolling the list. Thus, when an affirmative result is obtained at step SP67, the CPUU 20 advances to step SP69 to decide whether or not the f-th line is a line which has not been displayed.

When an affirmative result is obtained at step SP69, the CPU 20 moves to step SP68. On the contrary, when a negative result is obtained, the CPU 20 moves to step SP70 to erase the reference image 75A to 75G and the text information 44A to 44G on the f-th line, which are displayed on the screen, from the screen, and then moves to step SP68.

As described above, the CPU 20 sequentially decides whether or not each of all the lines of the list is a line which will be not displayed on the screen by a scrolling operation, regardless of the lines displayed or not displayed on the screen, at step SP66 to step SP70. As for the lines which will not be displayed on the screen, the reference image 75A to 75F for one frame and the text information 44A to 44F which are displayed on the screen at that time are erased from the screen.

Then, when the CPU 20 finishes the above mentioned decision to all the lines of the list because an affirmative result is obtained at step SP66, it advances to step SP71 to make access to the video server 3. Thereby, the CPU 20 reads the browser image data D3 or the encode data D2 for one frame of the video and audio material on a g-th line of the list to be newly displayed on the screen. Then, the CPU 20 ordinarily display the reference image 75A to 75G composed of the static browser image or static image for one frame based on the browser image data D3 of the encode data D2 and the text information 44A to 44G thereof on the g-th line of the list.

Next, the CPU 20 returns to step SP49 and repeats the loop of steps SP 49 to SP50–SP51–SP52 until an affirmative result is obtained at any of step 49 to step SP52.

Figure 18:
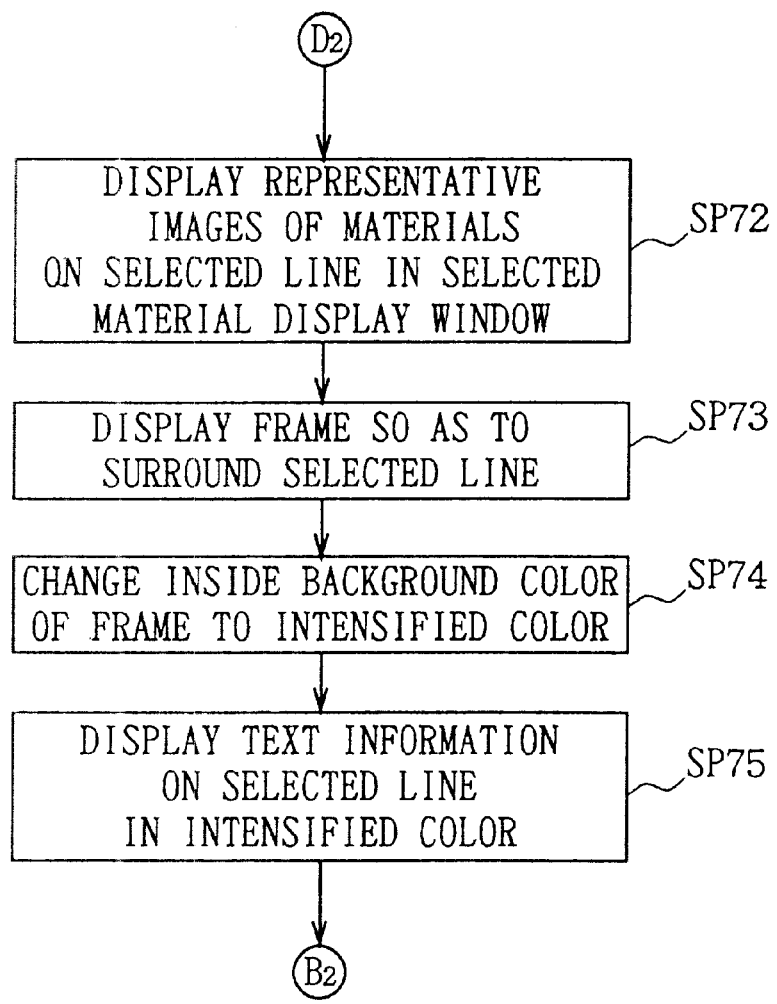

On the other hand, when the affirmative result is obtained at step SP52, the CPU 20 advances to step SP72 (see FIG. 18). After the CPU 20 performs the processes of step SP72 to step SP75 in the same manner as that of step SP34 to step SP37 in the list display window procedure RT1 of the first embodiment, it returns to step SP49. Then, the CPU 20 repeats the loop of steps SP49–SP50–SP51–SP52 until an affirmative result is obtained at any step SP49 to step SP52.

Further, when the affirmative result is obtained at step SP52, the CPU 20 advances to step SP76 to reset the timer 24, and then, moves to step SP77 to close the file of the video and audio material in which the reference image 75A to 75G is displayed in enlarged forms in the list display window 74.

Then, the CPU 20 proceeds to step SP78 to close the list display window 74, and then, moves to step SP79 to complete the list display window procedure RT2.

(2-3) Operation and Effects of Embodiment

According to the construction mentioned above, in the edit decision list creating device 70 of the second embodiment, the reference images 75A to 75G composed of the static browser images or the static images for one frame and the text information 44A to 44G of the corresponding video and audio materials are displayed, upon material selection mode, in a list form in the list display window 74 of the GUI screen 73 displayed on the display 31 of the client computer 71.

When the mouse 47 is moved onto any of the reference images 75A to 75G being displayed in the list display window 74, the reference image 75A to 75G of the corresponding video and audio material is displayed in enlarged forms as the dynamic browser image or the dynamic image.

Therefore, in the edit decision list creating device 70, even when there are a plurality of video and audio materials having similar text information 44A to 44G, the desired video and audio materials can be selected with ease based on the corresponding reference images 75A to 75G, like the edit decision list creating device 1 of the first embodiment.

Further, in the edit decision list creating device 70, since the usually static browser images or the static images are displayed on the GUI screen 73 as the reference images 75A to 75G of the respective video and audio materials, and further, the cursor 47 is moved onto the desired reference image 75A to 75G so as to display the reference image 75A to 75G in enlarged forms as the dynamic browser image or the dynamic image, the operator can readily grasp the contents of the video image of the desired video and audio material. Thus, the selecting work of the video and audio materials can be more easily performed.

With the construction mentioned above, the reference images 75A to 75G composed of the static browser images or the static images for one frame and the text information 44A to 44G of the corresponding video and audio materials are displayed in a list form in the list display window 74 of the GUI screen 73. Further, when the mouse 47 is moved onto any of the reference images 75A to 75G, the reference image 75A to 75G is displayed in enlarged forms as the dynamic browser image or the dynamic image. Consequently, the selecting work of the video and audio materials can be more readily performed. Thus, an edit decision list creating device by which the operating efficiency of the selecting work for the video and audio materials can be extremely improved can be realized.

(3) Other Embodiments

In the above described first and second embodiments, the text information, such as the file names, the titles, the number of frames, etc., of the video and audio materials is stored in the data base server 4 as the associated information of the video and audio materials to be stored in the data base server 4. However, the present invention is not limited thereto and other various kinds of associated information by which the respective video and audio materials can be identified can be stored in the data base server 4.

Further, according to the above first and second embodiments, the present invention is applied to the edit decision list creating device capable of selecting the desired video and audio materials out of a plurality of video and audio materials. However, the present invention is not limited thereto. In short, the present invention can be broadly applied to other various types of video material selecting apparatuses capable of selecting desired video and audio materials out of a plurality of video and audio materials.

Further, according to the above first and second embodiments, the storing means for storing the video data and associated data of a plurality of video and audio materials comprises the video server 3 having the recording and reproducing part with a disk array structure and the data base server 4. However, the present invention is not limited thereto and any different kinds of other structures can be widely employed.

Still further, according to the above first and second embodiments, a key word is inputted as a requirement to make the client computer 5 or 71 search the corresponding video and audio materials. However, the present invention is not limited thereto and the corresponding video and audio materials can be searched based on other various requirements.

Still further, according to the above first and second embodiments, the client computer 5 or 71 is constructed as shown in FIG. 3 as a screen display means for reading the browser image data D3 or the encode data D2, and the text data D4 of the corresponding video and audio materials out of a plurality of video and audio materials from the video server 3 and the data base server 4, and displaying on the screen the reference images 43A to 43F or 75A to 75G and the text information 44A to 44G of the video and audio materials based on the browser image data D3 or the encode data D2. However, the present invention is not limited thereto and other types of structures can be widely employed.

In addition, according to the above described first and second embodiments, the vertical slit images 12 are sequentially moved toward one direction (the direction shown by an arrow mark VX in FIG. 2) and extracted from a series of frame images which are obtained based on the data D1 of the video and audio materials and the extracted images are arranged sequentially in the other direction to form the browser images. However, the present invention is not limited thereto and directions other than the above described directions can be broadly employed as a direction of the slit images, a direction for extracting them and a direction for arranging them.

Additionally, according to the above first embodiment, the dynamic browser images or the dynamic images are simply displayed as the reference images 43A to 43F of the corresponding video and audio materials. However, the present invention is not limited thereto and the reference image 43A to 43F corresponding to the designated video and audio material can be displayed in enlarged forms as in the second embodiment.

Furthermore, according to the above described second embodiment, the reference image 75A to 75G designated from the reference images 75A to 75G being displayed in the list display window 74 of the GUI screen 73 are displayed in enlarged forms. However, the present invention is not limited thereto, and the designated reference images 75A to 75G can be simply displayed in ordinary sizes as the dynamic browser images or the dynamic images.

As mentioned above, the video data and associated data of video materials which satisfy the requirements inputted through an inputting means are read from a plurality of video materials of a storing means, and reference image and associated information of each video material are displayed on a screen based on the video data and the associated data. Therefore, the operator can grasp the contents of the corresponding video materials based on the reference images and associated information of the respective video materials which satisfy the requirements and which is displayed on the screen and can readily select the desired video materials. In such a way, the operating efficiency of the selecting work for the video materials can be remarkably improved.

Further, a first step of searching each video material which satisfies predetermined requirements out of the plurality of video materials and a second step of displaying the reference image and associated information of each of the video materials based on the video data and associated data of corresponding video materials. Therefore, the operator can grasp the contents of the corresponding video materials based on the reference images and associated information of the video materials which satisfy the requirements and which is displayed on the screen, and can readily select the desired video materials. Accordingly, the operating efficiency of the selecting work for the video materials can be remarkably improved.

While there has been described in connection with the preferred embodiments of the invention it will be obvious to those skilled in the art that various changes and modifications may be aimed, therefore, to cover in the appended claims all such changes and modifications as fall within the true spirit and scope of the invention

What is claimed is:

1. A video material selecting apparatus capable of selecting a desired video material out of a plurality of video materials, comprising:

storing means for storing video data and associated data of said plurality of video materials;

input means for inputting prescribed requirements; and display means for reading said video data and said associated data of each video material which satisfies said prescribed requirements, which are inputted through said input means, out of said plurality of video materials from said storing means, and for displaying a reference image and associated information of each video material on a screen based on said video data and said associated data, in which the reference image is a dynamic image, whereby said dynamic image is obtained from extracted slit images from a plurality of frame images, and for displaying a graphical user interface operable to have selected video material and information associated with a duration of said selected video material displayed therein.

2. The video material selecting apparatus according to claim 1, wherein said display means displays said dynamic image as said reference image of said each video material which satisfies said inputted requirements.

3. The video material selecting apparatus according to claim 1, wherein while said image display means displays a static image as said reference image of said each video material which satisfies said inputted requirements, it displays said dynamic image as said reference image of said video material designated out of said video materials.

4. The video material selecting apparatus according to claim 1, wherein said display means enlarges and displays said reference image of said video material designated out of the video materials of which said reference image and said associated information are displayed.

5. A video material selecting apparatus capable of selecting a desired video material out of a plurality of video materials, comprising:

storing means for storing video data and associated data of said plurality of video materials;

input means for inputting prescribed requirements; and display means for reading said video data and said associated data of each video material which satisfies said prescribed requirements, which are inputted through said input means, out of said plurality of video materials from said storing means, and for displaying a reference image and associated information of each video material on a screen based on said video data and said associated data, in which the reference image is a dynamic image, wherein said dynamic image is obtained by extracting slit images from a series of frame images based on said video data while sequentially moving the positions of said slit images toward one direction and then, by sequentially displaying static images for a plurality of frames which are formed by sequentially arranging the extracted slit images of each frame image in the other direction, for a cycle of prescribed frames, and for displaying a graphical user interface operable to have selected video material and information associated with a duration of said selected video material displayed therein.

6. A method of selecting a video material to select a desired video material out of a plurality of video materials, comprising the steps of:

搜searching said video materials which satisfy prescribed requirements out of said plurality of video materials;

displaying a reference image and associated information of each of said video materials based on video data and associated data of each of said video materials on a screen, in which the reference image is a dynamic image, whereby said dynamic image is obtained from extracted slit images from a plurality of frame images; and displaying a graphical user interface operable to have selected video material and information associated with a duration of said selected video material displayed therein.

7. The method of selecting a video material according to claim 6, wherein in said second step, said dynamic image is displayed as said reference image of each video material which satisfies said requirements.

8. The method of selecting a video material according to claim 6, wherein in said second step, while a static image is displayed as said reference image of said each video material which satisfies said requirements, a dynamic image is displayed as said reference image with respect to said video material designated out of said video materials.

9. The method of selecting a video material according to claim 6, wherein in said second step, said reference image is enlarged and displayed with respect to said video material designated out of the video materials of which said reference images and said associated information are displayed.

10. A method of selecting a video material to select a desired video material out of a plurality of video materials, comprising the steps of:

searching said video materials which satisfy prescribed requirements out of said plurality of video materials;

displaying a reference image and associated information of each of said video materials based on video data and associated data of each of said video materials on a screen, in which the reference image is a dynamic image, wherein said dynamic image is obtained by extracting slit images from a series of frame images based on said video data while sequentially moving the positions of said slit images toward one direction and then, by sequentially displaying static images for a plurality of frames, which are formed by sequentially arranging said extracted slit images of each frame image in the other direction, for a cycle of prescribed frames; and displaying a graphical user interface operable to have selected video material and information associated with a duration of said selected video material displayed therein.

* * * * *